United States Patent
Guo et al.

(10) Patent No.: US 11,832,305 B2
(45) Date of Patent: Nov. 28, 2023

(54) PARALLEL TRANSMISSION METHOD AND APPARATUS

(71) Applicant: HUAWEI TECHNOLOGIES CO., LTD., Guangdong (CN)

(72) Inventors: Yuchen Guo, Shenzhen (CN); Peng Liu, Shenzhen (CN); Sheng Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 2 days.

(21) Appl. No.: 17/071,549

(22) Filed: Oct. 15, 2020

(65) Prior Publication Data

US 2021/0029742 A1    Jan. 28, 2021

Related U.S. Application Data

(63) Continuation of application No. PCT/CN2019/082666, filed on Apr. 15, 2019.

(30) Foreign Application Priority Data

Apr. 16, 2018  (CN) .......................... 201810340116.8

(51) Int. Cl.
*H04W 4/08*     (2009.01)
*H04W 74/08*    (2009.01)
(Continued)

(52) U.S. Cl.
CPC ....... *H04W 74/0816* (2013.01); *H04W 72/04* (2013.01); *H04W 84/12* (2013.01)

(58) Field of Classification Search
CPC . H04W 74/0816; H04W 72/04; H04W 84/12; H04W 72/082; H04W 72/121;
(Continued)

(56) References Cited

U.S. PATENT DOCUMENTS

| 2013/0028243 A1 | 1/2013 | Wentink et al. |
| 2013/0229996 A1 | 9/2013 | Wang et al. |

(Continued)

FOREIGN PATENT DOCUMENTS

| CN | 1219087 A | 6/1999 |
| CN | 103209415 A | 7/2013 |

(Continued)

OTHER PUBLICATIONS

Lee et al. "Massive MIMO Full-Duplex for High-Efficiency Next Generation WLAN Systems," Oct. 2016, IEEE.*

(Continued)

*Primary Examiner* — Jae Y Lee
(74) *Attorney, Agent, or Firm* — WOMBLE BOND DICKINSON (US) LLP

(57) ABSTRACT

A parallel transmission method and apparatus to improve channel resource utilization are described. A first configuration parameter for a first access point is configured by a WLAN control device. A second configuration parameter for a second access point is configured by the WLAN control device. The first configuration parameter is used to indicate that the first access point can send a first WLAN frame to at least one station in a first station set at a starting time by using a channel resource. The first station set includes one or more stations associated with the first access point. The second configuration parameter is used to indicate that the second access point can send a second WLAN frame to at least one station in a second station set at the starting time by using the channel resource. The second station set includes one or more stations associated with the second access point.

18 Claims, 6 Drawing Sheets

(51) Int. Cl.
*H04W 72/04* (2023.01)
*H04W 84/12* (2009.01)

(58) Field of Classification Search
CPC .............. H04W 74/0808; H04W 74/08; H04L 27/2602; H04L 5/0037; H04L 5/0055; H04L 5/0073
See application file for complete search history.

(56) References Cited

U.S. PATENT DOCUMENTS

| | | |
|---|---|---|
| 2015/0049624 A1 | 2/2015 | Sun et al. |
| 2015/0085805 A1 | 3/2015 | Li et al. |
| 2015/0288427 A1* | 10/2015 | Wang .................. H04W 72/542 370/329 |
| 2016/0073429 A1 | 3/2016 | Oteri et al. |
| 2016/0157195 A1 | 6/2016 | Wang et al. |
| 2017/0250847 A1 | 8/2017 | Li et al. |
| 2018/0139635 A1* | 5/2018 | Oteri .................. H04W 74/0808 |
| 2018/0184402 A1* | 6/2018 | Cariou .............. H04W 74/0816 |
| 2018/0302858 A1* | 10/2018 | Son ........................ H04L 5/0094 |
| 2018/0310342 A1* | 10/2018 | Patil .................. H04W 74/0825 |
| 2020/0214034 A1* | 7/2020 | Li ...................... H04W 74/006 |

FOREIGN PATENT DOCUMENTS

| | | |
|---|---|---|
| CN | 105379332 A | 3/2016 |
| CN | 105393483 A | 3/2016 |
| CN | 106507491 A | 3/2017 |
| CN | 107547130 A | 1/2018 |
| EP | 3276843 A1 | 1/2018 |
| GB | 2552497 A | 1/2018 |
| JP | 2004260637 A | 9/2004 |
| JP | 2016501465 A | 1/2016 |
| JP | 2018157264 A | 10/2018 |
| WO | 2015147569 A1 | 10/2015 |
| WO | 2018136216 A1 | 7/2018 |

OTHER PUBLICATIONS

IEEE 1588V2,IEEE Std 1588-2008 (Revision of IEEE Std 1588-2002),IEEE Standard for a Precision Clock Synchronization Protocol for Networked Measurement and Control Systems,IEEE Instrumentation and Measurement Society,Technical Committee on Sensor Technology (TC-9),dated Jul. 24, 2008,total 289 pages.

\* cited by examiner

PARALLEL TRANSMISSION METHOD AND APPARATUS

CROSS-REFERENCE TO RELATED APPLICATIONS

This application is a continuation of International Application No. PCT/CN2019/082666, filed on Apr. 15, 2019, which claims priority to Chinese Patent Application No. 201810340116.8, filed on Apr. 16, 2018, both of which are hereby incorporated by reference in their entireties.

TECHNICAL FIELD

This application relates to the field of communications technologies, and in particular, to a parallel transmission method and apparatus.

BACKGROUND

A wireless local area network (WLAN) uses a carrier sense multiple access/collision avoidance (CSMA/CA) mechanism to avoid a collision between stations (STAs). In an embodiment, when an STA needs to send a signal and the collision occurs or a channel changes from busy to idle, the STA generates a random number, uses the random number as an initial value of a timer, and starts the timer. When a value of the timer decreases from the initial value to 0, the STA starts to send the signal. In this way, when a plurality of STAs need to send signals at the same time, an STA that generates a smaller random number may first send a signal.

The STA performs clear channel assessment (CCA) on the channel at any time. In an embodiment, if a receive power of a wireless signal received on the channel is greater than a CCA threshold, it indicates that the channel is busy. The STA cannot send a signal on a busy channel. If the receive power of the wireless signal received on the channel is less than or equal to the CCA threshold, it indicates that the channel is idle. The STA can send a signal on an idle channel.

It is specified in a standard that an access point (AP) also uses a method similar to the foregoing to send a signal and perform CCA. As a result, generally, when one AP sends a signal, another AP cannot send a signal on the channel because the another AP detects that the channel is busy. Consequently, channel resource utilization is not ideal.

SUMMARY

The application provides a parallel transmission method and apparatus, to improve channel resource utilization.

In an embodiment, the application provides a parallel transmission method. The method may include: A WLAN control device (referred to as a control device below) configures a first configuration parameter for a first access point, where the first configuration parameter is used to configure a first station set and a starting time, the first station set includes one or more stations associated with the first access point, and the first configuration parameter is used to indicate that the first access point can send a first WLAN frame to at least one station in the first station set at the starting time by using a channel resource. The control device configures a second configuration parameter for a second access point, where the second configuration parameter is used to configure a second station set and the starting time, the second station set includes one or more stations associated with the second access point, and the second configuration parameter is used to indicate that the second access point can send a second WLAN frame to at least one station in the second station set at the starting time by using the channel resource. Signal interference between any station in the first station set and any station in the second station set is less than or equal to a predefined threshold. For example, the first access point and the second access point may be two access points whose deployment locations are adjacent to each other.

The control device may be a device integrated with the first access point or the second access point, or may be a device independent of the first access point and the second access point. For example, if the control device is integrated with the first access point, that the control device configures a first configuration parameter for a first access point may include: the control device configures the first configuration parameter for the control device. If the control device is the device independent of the first access point, that the control device configures a first configuration parameter for a first access point may include: the control device sends the first configuration parameter to the first access point. For example, if the control device is the device integrated with the second access point, that the control device configures a second configuration parameter for a second access point may include: the control device configures the second configuration parameter for the control device. If the control device is the device independent of the second access point, that the control device configures a second configuration parameter for a second access point may include: the control device sends the second configuration parameter to the second access point.

It can be learned that the control device separately configures a corresponding configuration parameter for the first access point and the second access point, so that the first access point and the second access point can separately send, at a same time by using a same channel resource, a WLAN frame to at least one station in a station set separately configured for the first access point and the second access point. In this way, a plurality of access points can send WLAN frames by using a same channel resource, to improve channel resource utilization. Access points that send signals do not detect that a channel is busy, and the access points send the signals at a same starting time. Therefore, a signal of one access point does not cause a CCA result of another access point to be busy because the plurality of access points send signals at the same time. In addition, because signal interference between any station in the first station set and any station in the second station set is less than the predefined threshold, the WLAN frame that is transmitted in parallel can be correctly decoded by properly setting the predefined threshold.

In an embodiment, the first configuration parameter is used to configure the channel resource, or the second configuration parameter is used to configure the channel resource. Alternatively, the first configuration parameter is used to configure the channel resource, and the second configuration parameter is used to configure the channel resource. This provides a setting manner in which the control device specifies a channel resource used by the plurality of access points for parallel transmission. If the channel resource is an operating channel (operating channel) of the access point, the configuration parameter does not need to configure the channel resource.

In an embodiment, the first configuration parameter is used to configure a transmit power of the first WLAN frame, or the second configuration parameter is used to configure a transmit power of the second WLAN frame. Alternatively, the first configuration parameter is used to configure the transmit power of the first WLAN frame, and the second configuration parameter is used to configure the transmit power of the second WLAN frame. This provides a manner of setting transmit powers of WLAN frames (for example, the first WLAN frame and/or the second WLAN frame) transmitted by the plurality of access points in parallel. In this way, transmit powers of some or all WLAN frames transmitted by the plurality of access points in parallel is centrally configured by the control device. This helps reduce interference between the WLAN frames transmitted in parallel by the plurality of access points.

In an embodiment, the first WLAN frame is a first trigger frame, the first configuration parameter is used to configure trigger frame duration of the first trigger frame, the second WLAN frame is a second trigger frame, the second configuration parameter is used to configure trigger frame duration of the second trigger frame, and the trigger frame duration of the first trigger frame is equal to the trigger frame duration of the second trigger frame. This provides a manner of configuring trigger frame duration when the WLAN frames transmitted in parallel by the plurality of access points are trigger frames (for example, the first trigger frame and the second trigger frame). In this way, the following problem caused by inconsistent trigger frame duration can be effectively avoided: An access point that has completely sent a trigger frame determines, because the access point detects a trigger frame that is not completely sent by another access point, that a channel is busy, so that the access point that has completely sent the trigger frame cannot occupy the channel. Consequently, the plurality of access points cannot continue to perform parallel signal transmission.

In an embodiment, the method may include: the control device obtains a first receive power, where the first receive power is a receive power used by the first access point to receive a signal sent by a first station associated with the first access point. The control device obtains a second receive power, where the second receive power is a receive power used by the second access point to receive the signal sent by the first station. In addition, the control device determines, based on that a ratio of the first receive power to the second receive power (e.g., a signal-to-interference ratio of the first station) is greater than or equal to a second predefined threshold, that the first station belongs to the first station set. Certainly, if the ratio of the first receive power to the second receive power is less than the second predefined threshold, the control device determines that the first station does not belong to the first station set.

For example, if the control device is integrated with the first access point, that the control device obtains a first receive power may include: the control device obtains the first receive power according to any method that can obtain the receive power. If the control device is a device independent of the first access point, that the control device obtains a first receive power may include: the control device receives the first receive power sent by the first access point, or information (for example, an index of the first receive power) used to indicate the first receive power.

For example, if the control device is integrated with the second access point, that the control device obtains a second receive power may include: the control device obtains the second receive power according to any method that can obtain the receive power. If the control device is a device independent of the second access point, that the control device obtains a second receive power may include: the control device receives the second receive power sent by the second access point, or information (for example, an index of the second receive power) used to indicate the second receive power.

In an embodiment, whether a station (for example, the first station) associated with the first access point belongs to the first station set is determined. In an embodiment, the signal-to-interference ratio of the first station is greater than or equal to the second predefined threshold is an implementation of determining that the signal interference between the first station and any station in the second station set is less than the predefined threshold.

In an embodiment, the method may include: the control device obtains a first distance, where the first distance is a distance between the first station associated with the first access point and the first access point. The control device determines, based on that the first distance is less than or equal to a third predefined threshold, that the first station belongs to the first station set. Certainly, if the first distance is greater than the third predefined threshold, the control device determines that the first station does not belong to the first station set.

In an embodiment whether a station (for example, the first station) associated with the first access point belongs to the first station set is determined. In an embodiment, it may be understood that, that the distance between the first station and the first access point is greater than or equal to the third predefined threshold is an implementation of determining that the signal interference between the first station and any station in the second station set is less than the predefined threshold. Certainly, the application is not limited thereto.

Correspondingly, in an embodiment, the method may include: the control device obtains a third receive power, where the third receive power is a receive power used by the second access point to receive a signal sent by a second station associated with the second access point. The control device obtains a fourth receive power, where the fourth receive power is a receive power used by the first access point to receive the signal sent by the second station. Then, the control device determines, based on that a ratio of the third receive power to the fourth receive power is greater than or equal to the second predefined threshold, that the second station belongs to the second station set. Certainly, if the ratio of the third receive power to the fourth receive power is less than the second predefined threshold, the control device determines that the second station does not belong to the second station set. In another possible design, the method may include: the control device obtains a second distance, where the second distance is a distance between the second station associated with the second access point and the second access point. The control device determines, based on that the second distance is less than or equal to the third predefined threshold, that the second station belongs to the second station set. Certainly, if the second distance is greater than the third predefined threshold, the control device determines that the second station does not belong to the second station set.

In an embodiment, the application provides a parallel transmission method. The method may include: An access point receives a configuration parameter sent by a WLAN control device, where the configuration parameter is used to configure a station set and a starting time, the station set includes one or more stations associated with the access point, and the configuration parameter is used to indicate that the access point can send a WLAN frame to at least one station in the station set at the starting time by using a channel resource; and the access point sends, based on the configuration parameter, the WLAN frame to the at least one station in the station set at the starting time by using the channel resource. For example, the access point may be the first access point or the second access point as described herein.

In an embodiment, the configuration parameter is used to configure the channel resource.

In an embodiment, the configuration parameter is used to configure a transmit power of the WLAN frame. In this case, that the access point sends, based on the configuration parameter, the WLAN frame to the at least one station in the station set at the starting time by using the channel resource may include: the access point sends, based on the configuration parameter, the WLAN frame at the starting time by using the channel resource and the transmit power of the WLAN frame.

In an embodiment, the WLAN frame is a trigger frame, and the configuration parameter is used to configure trigger frame duration. In this case, that the access point sends, based on the configuration parameter, the WLAN frame to the at least one station in the station set at the starting time by using the channel resource may include: the access point sends a trigger frame whose duration is the trigger frame duration to the at least one station in the station set at the starting time by using the channel resource.

In an embodiment, the access point may be the first access point. In this case, the method may include: the first access point receives a first configuration parameter sent by the WLAN control device, where the first configuration parameter is used to configure a first station set and the starting time, the first station set includes one or more stations associated with the first access point, and the first configuration parameter is used to indicate that the first access point can send the WLAN frame to the at least one station in the first station set at the starting time by using the channel resource; and the first access point sends, based on the first configuration parameter, the WLAN frame to at least one station in the first station set at the starting time by using the channel resource. Signal interference between any station in the first station set and any station in a second station set is less than a predefined threshold. The second station set includes one or more stations associated with the second access point, and the second access point can transmit a second data frame to at least one station in the second station set at the starting time by using the channel resource.

In an embodiment, the access point may be the first access point, and the method may include: the first access point sends a first receive power to the control device, where the first receive power is a receive power used by the first access point to receive a signal sent by a first station associated with the first access point, and is used to control the device to determine, based on that a ratio of the first receive power to a second receive power is greater than a second predefined threshold, that the first station belongs to the first station set, and the second receive power is a receive power used by the second access point to receive the signal sent by the first station.

In an embodiment, the application provides a WLAN control device, and the WLAN control device may be configured to perform the methods as described herein. In an embodiment, function modules of the control device may be obtained through division according to the methods as described herein. For example, the function modules may be obtained through division corresponding to functions, or two or more functions may be integrated into one processing module.

In an embodiment, the application provides an access point, and the access point may be configured to perform the methods as described herein. In an embodiment, function modules of the access point may be obtained through division according to the methods as described herein. For example, the function modules may be obtained through division corresponding to functions, or two or more functions may be integrated into one processing module.

In an embodiment, the application provides a WLAN control device, and the WLAN control device may include a processor and a transceiver. The processor is configured to: send a first configuration parameter to a first access point through the transceiver, where the first configuration parameter is used to configure a first station set and a starting time, the first station set includes one or more stations associated with the first access point, and the first configuration parameter is used to indicate that the first access point can send a first WLAN frame to at least one station in the first station set at the starting time by using a channel resource; and send a second configuration parameter to the second access point through the transceiver, where the second configuration parameter is used to configure a second station set and the starting time, the second station set includes one or more stations associated with the second access point, and the second configuration parameter is used to indicate that the second access point can send a second WLAN frame to at least one station in the second station set at the starting time by using the channel resource. Signal interference between any station in the first station set and any station in the second station set is less than a predefined threshold.

In an embodiment, the application provides an access point, and the access point may include a processor and a WLAN chip. The processor is configured to set a first configuration parameter for the WLAN chip, where the first configuration parameter is used to configure a first station set and a starting time, the first station set includes one or more stations associated with the access point, and the first configuration parameter is used to indicate that the WLAN chip can send a first WLAN frame to at least one station in the first station set at the starting time by using a channel resource. The WLAN chip is configured to: receive a plurality of WLAN frames from the processor, select, from the plurality of WLAN frames, a WLAN frame whose receiver is a station in the first station set as the first WLAN frame, and send the first WLAN frame at the starting time by using the channel resource. The processor is configured to set a second configuration parameter for another access point (for example, send the second configuration parameter through a wired/wireless transceiver, where the wireless transceiver may include the WLAN chip), where the second configuration parameter is used to configure a second station set and the starting time, the second station set includes one or more stations associated with the second access point, and the second configuration parameter is used to indicate that the another access point can send a second WLAN frame to at least one station in the second station set at the starting time by using the channel resource.

In an embodiment, the application provides an access point, and the access point may include a transceiver, a processor, and a WLAN chip. The processor is configured to receive, through the transceiver, a configuration parameter sent by a WLAN control device, where the configuration parameter is used to configure a station set and a starting time, the station set includes one or more stations associated with the access point, and the configuration parameter is used to indicate that the access point can send a target WLAN frame to at least one station in the station set at the starting time by using a channel resource. The WLAN chip is configured to: receive a plurality of WLAN frames from the processor, select, from the plurality of WLAN frames, a WLAN frame whose receiver is a station in the station set as the target WLAN frame, and send the target WLAN frame at the starting time by using the channel resource. For example, the transceiver may be a wired transceiver or a wireless transceiver. The wireless transceiver may include the WLAN chip.

In an embodiment, the application provides a processing apparatus, configured to implement a function of the control device or the access point. The processing apparatus includes a processor and an interface, and the processing apparatus may be a chip. The processor may be implemented by hardware, or may be implemented by software. When the processor is implemented by the hardware, the processor may be a logic circuit, an integrated circuit, or the like; or when the processor is implemented by the software, the processor may be a general-purpose processor, and is implemented by reading software code stored in the memory. The memory may be integrated into the processor, may be located outside the processor, or may exist independently.

The application provides a computer-readable storage medium. The computer-readable storage medium stores program code, and the program code includes instructions for performing some or all of operations in any method as described herein.

The application provides a computer program product. When the computer program product runs on a computer, the computer is enabled to perform some or all operations of any method as described herein.

For specific implementations and beneficial effects of any one of the control device, the access point, the processing apparatus, the computer-readable storage medium, the computer program product, and the like provided above, refer to the embodiments as described herein. Details are not described herein again.

DESCRIPTION OF EMBODIMENTS

The term "and/or" in the embodiments of the application describes only an association relationship for describing associated objects and represents that three relationships may exist. For example, A and/or B may represent the following three cases: Only A exists, both A and B exist, and only B exists. In addition, in the descriptions of the application, "a plurality of" means two or more than two unless otherwise specified. In addition, to clearly describe the technical solutions in the embodiments of the application, the terms such as "first" and "second" are used in the embodiments of the application to distinguish between same items or similar items that have basically same functions and purposes. One of ordinary skill in the art may understand that the terms such as "first" and "second" do not limit a quantity or an execution sequence, and that the terms such as "first" and "second" do not indicate a definite difference.

Figure 1:
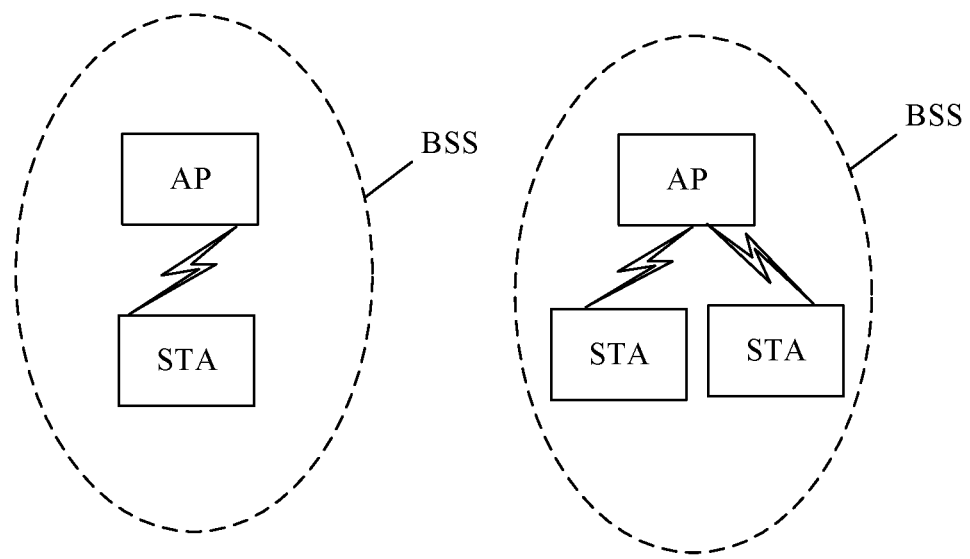
FIG. 1 is a schematic diagram of a system in a typical WLAN deployment scenario according to one embodiment of the application.

The technical solutions provided in the embodiments of the application may be applied to a WLAN. FIG. 1 is a schematic diagram of a system in a typical WLAN deployment scenario according to one embodiment of the application. The system shown in FIG. 1 may include a plurality of basic service sets (BSSs), and each BSS may include one AP and one or more STAs associated with the AP 20. The AP is a device that includes an STA and provides an STA associated with the AP through a wireless medium with access to a distribution service. One AP includes one STA and one distribution system access function (DSAF). The STA is a non-AP station (non-AP STA) or an AP, for example, a mobile phone that supports a WLAN, a tablet computer that supports a WLAN, a set-top box that supports a WLAN, a smart television that supports a WLAN, a wearable device that supports a WLAN, or a computer that supports a WLAN.

Figure 2:
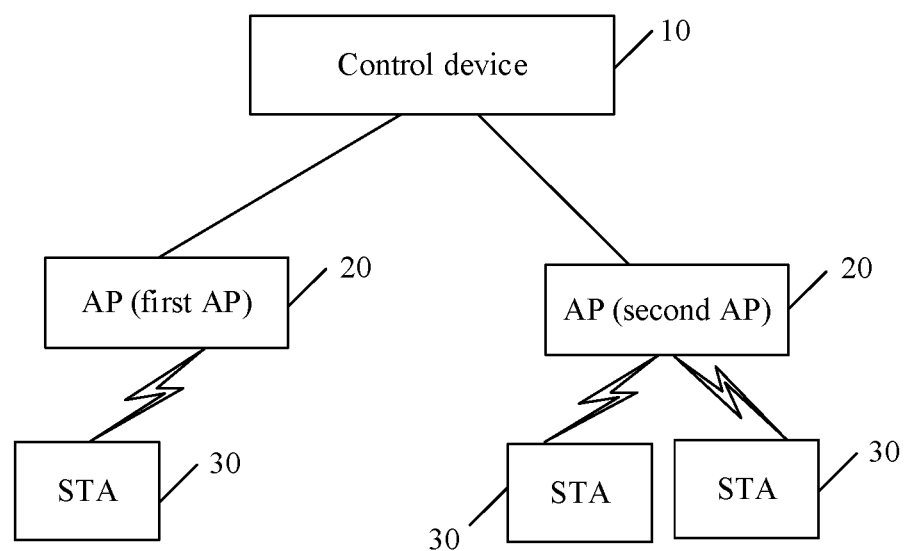
FIG. 2 is a schematic diagram of a network architecture according to an embodiment of the application.

FIG. 2 is a schematic diagram of a network architecture according to an embodiment of the application. The network architecture shown in FIG. 2 includes a WLAN control device 10 (referred to as a control device below), at least two APs 20, and one or more STAs 30 connected to each of the at least two APs 20. The at least two APs 20 may be at least two APs that are adjacent in deployment locations.

The control device 10 may be integrated with one AP 20 of the at least two APs 20. In this case, it may be considered that the AP 20 is a device that integrates a function of the control device 10 and a function of the AP. It may be understood that, if the at least two APs in the network architecture have the function of the control device 10, which AP serves as the control device 10 may be preset during network deployment, or may be determined by the at least two APs 20 through information exchange. This is not limited in the application. Any two APs may be directly connected in a wired manner, for example, connected through an Ethernet cable, or may be indirectly connected in a wired manner, for example, through a switch. Neighboring APs can also be wirelessly connected. In addition, the control device 10 may also be a device independent of the at least two APs 20. In FIG. 2, an example in which the control device 10 is the device independent of the at least two APs 20 is used for description.

That the at least two APs 20 provide parallel transmission under control of which control device 10 may be preset during network deployment, or may be determined through information exchange. This is not limited in the application.

The following describes functions of devices (including the control device 10, a first AP, and a second AP) in the network architecture shown in FIG. 2 by using an example in which the at least two APs 20 include the first AP and the second AP, and the first AP and the second AP are two APs that are adjacent in deployment locations.

The control device 10 is configured to set a first configuration parameter for the first AP, and configure a second configuration parameter for the second AP. The first configuration parameter is used to configure a first STA set and a starting time, and the first STA set includes one or more STAs associated with the first AP. The first configuration parameter is used to indicate that the first AP can send a first WLAN frame to at least one STA in the first STA set at the starting time by using a first channel resource. The second configuration parameter is used to configure a second STA set and the starting time, and the second STA set includes one or more STAs associated with the second AP. The second configuration parameter is used to indicate that the second AP can send a second WLAN frame to at least one STA in the second STA set at the starting time by using the first channel resource. Signal interference between any STA in the first STA set and any STA in the second STA set is less than a predefined threshold. That the interference is less than the predefined threshold includes that the interference is less than the predefined threshold, or the interference is less than or equal to the predefined threshold.

In an embodiment, if the control device 10 is integrated with the first AP, that the control device 10 configures the first configuration parameter for the first AP may be understood as that the control device 10 configures the first configuration parameter for the control device 10. If the control device 10 is a device independent of the first AP, that the control device 10 configures the first configuration parameter for the first AP may be understood as that the control device 10 sends the first configuration parameter to the first AP. If the control device 10 is a device integrated with the second AP, that the control device 10 configures the second configuration parameter for the second AP may be understood as that the control device 10 configures the second configuration parameter for the control device 10. If the control device 10 is a device independent of the second AP, that the control device configures the second configuration parameter for the second AP may be understood as that the control device 10 sends the second configuration parameter to the second AP.

The first AP is configured to send, based on the first configuration parameter, the first WLAN frame to the at least one STA in the first STA set at the starting time by using the first channel resource. For example, the first AP is configured to start, at the starting time based on the first configuration parameter, to send the first WLAN frame to the at least one STA in the first STA set by using the first channel resource.

The second AP is configured to send, based on the second configuration parameter, the second WLAN frame to the at least one STA in the second STA set at the starting time by using the first channel resource. For example, the second AP is configured to start, at the starting time based on the second configuration parameter, to send the second WLAN frame to the at least one STA in the second STA set by using the first channel resource.

The first WLAN frame and the second WLAN frame may include any one of the following: a data frame, a control frame, or a management frame. Types of the first WLAN frame and the second WLAN frame may be the same or may be different.

The channel resource may be a channel or a channel combination (for example, a combination of a primary channel and a non-primary channel), or may be a time-frequency channel resource and/or a space-domain channel resource obtained after channel deaggregation. Based on time-frequency division, each channel may be divided into a plurality of resource units (RUs). A method for dividing one channel into a plurality of RUs is not limited in the application. Based on space-domain division, a channel may be divided into a spatial stream used for transmitting a WLAN frame on the channel. The channel is a frequency domain range, and a size of the frequency domain range is, for example, 20 megahertz (MHz).

In an embodiment, the control device may separately configure a corresponding configuration parameter for the first AP and the second AP, so that the first AP and the second AP can send, at a same starting time by using a same channel resource, a WLAN frame to at least one STA in an STA set separately configured for the first AP and the second AP. In this way, a plurality of APs can transmit WLAN frames in parallel by using a same channel resource, to improve channel resource utilization. Access points that send signals do not detect that a channel is busy, and the access points send the signals at a same starting time. Therefore, a signal of one access point does not cause a CCA result of another access point to be busy because the plurality of access points send signals at the same time. In addition, because the signal interference between any station in the first station set and any station in the second station set is less than the predefined threshold, the WLAN frame that is transmitted in parallel can be correctly decoded by properly setting the predefined threshold.

Extensibely, when there are a plurality of second APs adjacent to a deployment location of the first AP, the control device may separately configure one second STA set and the starting time for each of the plurality of second APs adjacent to the first AP. In this case, that the signal interference between any STA in the first STA set and any STA in the second STA set is less than the predefined threshold may be extended to that the signal interference between any STA in the first STA set and any STA in each second STA set is less than the predefined threshold. In addition, in addition to directly determining whether the signal interference between the STAs is less than the predefined threshold, another method may be used to determine STAs whose signal interference between the STAs is less than the predefined threshold. For example, the STAs are positioned, and a plurality of STAs whose distances from the APs associated with the STAs are less than a distance threshold are used as the STAs whose signal interference is less than the predefined threshold.

In an embodiment, a plurality of APs are evenly deployed, for example, a large scale auditorium, for example, an auditorium used to watch various games. In this scenario, locations of STAs are fixed in a specific range, and the locations of the STAs are evenly distributed and a quantity of the STAs is relatively large. In this scenario, a plurality of APs are usually deployed, and each AP communicates with STAs in an area. In this case, interference caused by a signal sent by another AP around an AP to a signal sent by the AP is approximately the same. Therefore, the control device may measure the interference caused by the signal sent by the AP around the AP to the signal sent by the AP, to determine an STA set configured for the AP.

The following describes, with reference to FIG. 1 and FIG. 2, the parallel transmission method provided in the embodiments of the application. The following uses an example in which the control device is a device independent of the first AP and the second AP for description. Unified description is provided herein, and details are not described in the following.

Figure 3:
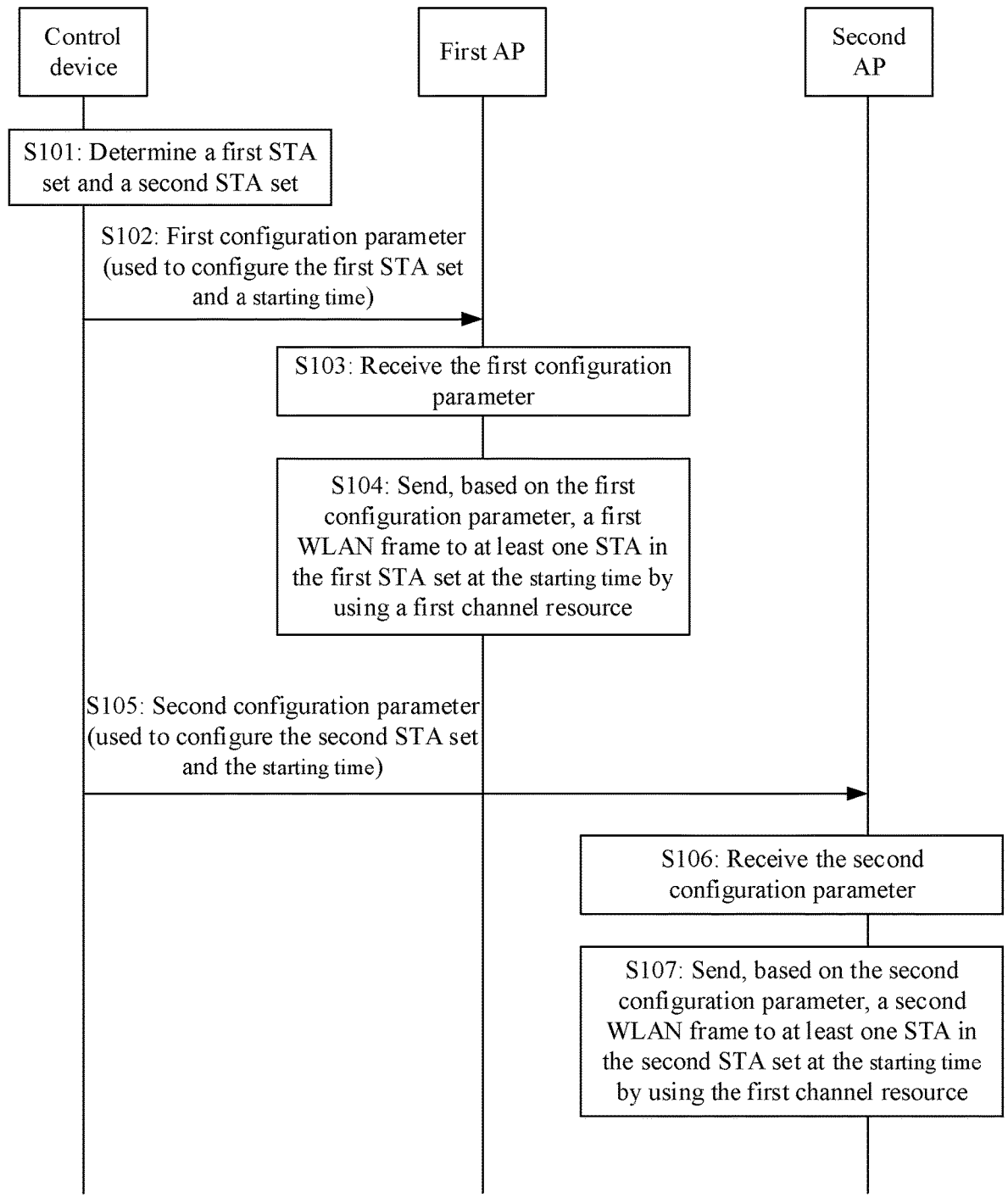
FIG. 3 is a schematic diagram of a parallel transmission method according to an embodiment of the application.

FIG. 3 is a schematic diagram of a parallel transmission method according to an embodiment of the application. The method includes the following operations.

S101: A control device determines a first STA set and a second STA set. The first STA set includes one or more STAs associated with a first AP, and the second STA set includes one or more STAs associated with a second AP. Signal interference between any STA in the first STA set and any STA in the second STA set is less than a predefined threshold.

If locations of STAs associated with the first AP and the second AP are fixed, the first STA set and the second STA set may be manually specified. In this scenario, S101 may be omitted.

A trigger condition for determining the first STA set and the second STA set by the control device is not limited in the application. For example, the trigger condition may be periodic triggering, or may be event triggering. The STAs in the first STA set are some or all STAs associated with the first AP. The STAs in the second STA set are some or all STAs associated with the second AP.

A specific representation form in which the signal interference between any STA in the first STA set and any STA in the second STA set is less than the predefined threshold is not limited in the application. For example, a larger signal-to-interference ratio indicates stronger interference strength. Therefore, that the signal interference between any STA in the first STA set and any STA in the second STA set is less than the predefined threshold may be represented as follows: A signal-to-interference ratio between any STA in the first STA set and any STA in the second STA set is greater than or equal to a second predefined threshold. For another example, an STA closer to an AP receives less interference from an STA associated with another AP. Therefore, that the signal interference between any STA in the first STA set and any STA in the second STA set is less than the predefined threshold may be represented as follows: A distance between any STA in the first STA set and the first AP is less than or equal to a third predefined threshold, and a distance between any STA in the second STA set and the second AP is less than or equal to a fourth predefined threshold. The third predefined threshold may be equal or unequal to the fourth predefined threshold. Certainly, the application is not limited thereto.

Assuming that a first STA is any STA associated with the first AP, and a second STA is any STA associated with the second AP, signal interference between the first STA and the second STA may include one of the following cases.

Case 1: A signal sent by the first AP to the first STA is interfered with by a signal sent by the second AP.

Case 2: A signal sent by the second AP to the second STA is interfered with by a signal sent by the first AP.

Figure 4:
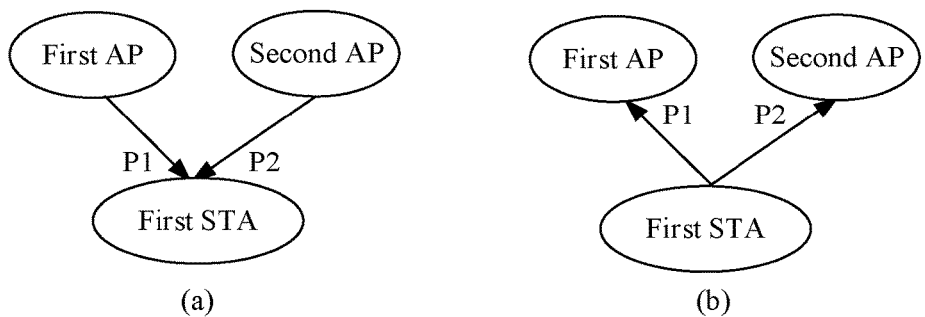
FIG. 4 is a schematic diagram of interference between STAs according to an embodiment of the application.

In an example, that signal interference between the first STA and the second STA is that the signal sent by the first AP to the first STA is interfered with the signal sent by the second AP (e.g., the case 1) is used as an example, and the signal-to-interference ratio may be represented as a ratio of a receive power P1 used by the first STA to receive the signal sent by the first AP to a receive power P2 used by the first STA to receive the signal sent by the second AP, as shown in (a) in FIG. 4. Considering that attenuation occurring when a signal is transmitted from an STA to an AP is the same as attenuation occurring when the signal is transmitted from the AP to the STA, the signal-to-interference ratio may alternatively be represented as a ratio of a receive power P1 used by the first AP to receive a signal sent by the first STA to a receive power P2 used by the second AP to receive a signal sent by the first STA, as shown in (b) in FIG. 4. If the signal-to-interference ratio is greater than or equal to a second predefined threshold, the control device may determine that the first STA belongs to the first STA set. Otherwise, the control device may determine that the first STA does not belong to the first STA set.

Based on this, before the S101, the method may include the following operations: the control device receives a first receive power sent by the first AP, where the first receive power is a receive power used by the first AP to receive the signal sent by the first STA, e.g., the receive power P1. The control device receives a second receive power sent by the second AP, where the second receive power is a receive power used by the second AP to receive the signal sent by the first STA, e.g., the receive power P2. In this case, the S101 may include the following operation: If a ratio (e.g., P1/P2) of the first receive power to the second receive power is greater than or equal to the second predefined threshold, the control device determines that the first STA belongs to the first STA set. If the ratio is less than the second predefined threshold, the control device determines that the first STA does not belong to the first STA set.

Likewise, that signal interference between the first STA and the second STA is that the signal sent by the second AP to the second STA is interfered with by the signal sent by the first AP (e.g., the case 2) is used as an example, and the signal-to-interference ratio may be represented as a ratio of a receive power P3 used by the second AP to receive the signal sent by the second STA to a receive power P4 used by the first AP to receive the signal sent by the second STA. If the signal-to-interference ratio is greater than or equal to the second predefined threshold, the control device may determine that the second STA belongs to the second STA set. If the signal-to-interference ratio is less than the second predefined threshold, the control device may determine that the second STA does not belong to the second STA set.

Based on this, before the S101, the method may include the following operations: the control device receives a third receive power sent by the second AP, where the third receive power is a receive power used by the second AP to receive the signal sent by the second STA, e.g., the receive power P3. The control device receives a fourth receive power sent by the first AP, where the fourth receive power is a receive power used by the first AP to receive the signal sent by the second STA, e.g., the receive power P4. In this case, the S101 may include the following step: If a ratio (e.g., P3/P4) of the third receive power to the fourth receive power is greater than or equal to the second predefined threshold, the control device determines that the second STA belongs to the second STA set. If the ratio is less than the second predefined threshold, the control device determines that the second STA does not belong to the second STA set.

Optionally, any receive power (for example, any one of P1 to P4) may be represented by using a channel quality indicator (CQI) or a received signal strength indication (RSSI). This is not limited in the application.

In another example, regardless of whether the signal interference between the first STA and the second STA is represented in the case 1 or the case 2, if a distance between the first STA and the first AP is less than or equal to the third predefined threshold, it may be considered that the first STA is a "center user" of the first AP, in this case, the control device may determine that the first STA belongs to the first STA set. Otherwise, it may be considered that the first STA is an "edge user" of the first AP, and the control device may determine that the first STA does not belong to the first STA set.

Based on this, optionally, before the S101, the method may include: the first AP measures locations of one or more STAs associated with the first AP, determines, based on the locations obtained through measurement, an identifier of an STA whose distance from the first AP is less than or equal to the third predefined threshold, and sends the identifier of the determined STA to the control device, so that the control device determines the first STA set. Alternatively, the first AP sends, to the control device, the locations obtained through measurement and identifiers of the STAs corresponding to the locations, and the control device determines the identifier of the STA whose distance from the first AP is less than or equal to the third predefined threshold, to determine the first STA set. Certainly, the application is not limited thereto.

Likewise, regardless of whether the signal interference between the first STA and the second STA is represented in the case 1 or the case 2, if a distance between the second STA and the second AP is less than or equal to the fourth predefined threshold, the control device may determine that the second STA belongs to the second STA set. Otherwise, the control device may determine that the second STA does not belong to the second STA set. Based on this, for operations performed by the second AP, refer to the operations performed by the first AP. Details are not described herein again.

S102: the control device sends a first configuration parameter to the first AP, where the first configuration parameter is used to configure the first STA set and a starting time. The first configuration parameter is used to indicate that the first AP can send a first WLAN frame to at least one STA in the first STA set at the starting time by using a first channel resource.

A type of information carried in the first configuration parameter to configure the first STA set and the starting time is not limited in the application. For example, the first STA set may be configured by carrying an identifier of an STA included in the first STA set. For example, the starting time may be configured by carrying the starting time.

Optionally, configuration parameters (including the first configuration parameter and a second configuration parameter described below) may be sent through a wired network of an Ethernet, or may be sent through an air interface. For example, in a network with a large scale, for example, a network with a relatively high AP deployment density, the configuration parameters may be sent in a form of IP packets through the wired network of the Ethernet. Certainly, the application is not limited thereto.

In an embodiment, the control device may not configure a specific WLAN frame type (for example, a data frame or a trigger frame) of the first WLAN frame, but the first AP determines the first WLAN frame, for example, determines the first WLAN frame based on an actual transmission requirement. In another embodiment, the control device may alternatively configure the specific WLAN frame type of the first WLAN frame.

S103: the first AP receives the first configuration parameter sent by the control device.

S104: the first AP sends, based on the first configuration parameter, the first WLAN frame to the at least one STA in the first STA set at the starting time by using the first channel resource. For example, the first AP is configured to start to send the first WLAN frame to the at least one STA in the first STA set at the starting time by using the first channel resource.

For the first AP, the first configuration parameter may be used as a reference, and the first AP does not necessarily need to send the first WLAN frame to the at least one STA in the first STA set at the starting time by using the first channel resource. For example, if the first AP does not have any to-be-sent WLAN frame at the starting time, the S104 is not performed. For another example, if the first channel resource is unavailable (for example, the channel is busy) at the starting time, the S104 is not performed.

How the first AP selects an STA or STAs in the first STA set to send the first WLAN frame is not limited in the application. In an embodiment, the selection may be performed based on an actual transmission requirement. For example, when determining to schedule one or more STAs in the first STA set, the first AP may choose to send the first WLAN frame to the one or more STAs. The first AP may determine, based on a buffer status report (BSR) sent by an associated STA, a to-be-scheduled STA, or when a signal needs to be sent to one or more STAs, determine that the STA or the STAs are to-be-scheduled STAs. Certainly, the application is not limited thereto. In addition, because different STAs associated with a same AP cannot use a same channel resource to transmit signals at the same time, the first AP may determine a quantity of to-be-scheduled STAs based on a quantity of types of channel resources that are of the first AP and that are used for parallel transmission. Different channel resources are considered as different types of channel resources. For example, if a channel resource includes a time-frequency channel resource and a space-domain channel resource, time-frequency channel resources that are of the first AP and that are used for the parallel transmission are an RU 1, an RU 2, and an RU 3, and space-domain channel resources used for the parallel transmission are a spatial stream 1 and a spatial stream 2. In this case, the types of channel resources used for the parallel transmission are separately the RU 1 and the spatial stream 1, the RU 1 and the spatial stream 2, the RU 2 and the spatial stream 1, the RU 2 and the spatial stream 2, the RU 3 and the spatial stream 1, and the RU 3 and the spatial stream 2. In other words, there are six types of channel resources used for the parallel transmission. For ease of description, the following describes a case in which the channel resource is the time-frequency channel resource.

The first channel resource may be configured by the control device for the first AP by using the first configuration parameter or another configuration parameter. In addition, the first channel resource may also be preset. For example, the first AP may work on a channel. In other words, the first AP may send a signal by using the channel. For another example, a time-frequency channel resource of an operating channel of the first AP is pre-divided into 10 RUs, which are respectively marked as an RU 1 to an RU 10. In this case, the first AP may reserve one or more RUs in the RU 1 to the RU 10 as an RU used to implement parallel signal transmission. For example, the RU 1 to the RU 3 may be reserved as RUs used to implement the parallel signal transmission. In other words, all the RU 1 to the RU 3 may be used as the first channel resource. In this case, optionally, other RUs (e.g., the RU 4 to the RU 10) may be RUs used when a signal is transmitted based on a CSMA/CA mechanism. It is assumed that a plurality of RUs are reserved as the first channel resource. In this case, the first AP allocates a specific RU to an STA scheduled this time. This is not limited in the application. For example, assuming that the first STA set configured by the control device for the first AP includes an STA 11 to an STA 15, the first AP may select any one to three STAs from the STA 11 to the STA 15, and allocate one RU of the RU 1 to the RU 3 to each STA. Different RUs are allocated to different STAs. For example, the first AP may send the first WLAN frame to the STA 11 by using the RU 1, send the first WLAN frame to the STA 12 by using the RU 2, and send the first WLAN frame to the STA 13 by using the RU 3. The first AP may send a same first WLAN frame or different first WLAN frames to different STAs.

Optionally, the first configuration parameter is used to configure a transmit power of the first WLAN frame. In this case, the S104 may include: the first AP sends, based on the first configuration parameter, the first WLAN frame to the at least one STA in the first STA set at the starting time by using the first channel resource and the transmit power of the first WLAN frame. When a transmit power of a WLAN frame is higher, interference caused by the WLAN frame to another WLAN frame transmitted at the same time is greater. Therefore, in an embodiment, the control device configures the transmit power of the first WLAN frame, to help reduce interference caused by the first WLAN frame to a WLAN frame (for example, the second WLAN frame) that is transmitted at the same time.

Optionally, the first configuration parameter is used to configure at least one piece of the following information: a modulation and coding scheme (MCS) used to transmit the first WLAN frame, and the number of streams (nNsts) used to transmit the first WLAN frame, dual carrier modulation (DCM) used to transmit the first WLAN frame, an encoding manner used to transmit the first WLAN frame, space time block coding (STBC) used to transmit the first WLAN frame, and the like. This helps optimize resource allocation.

S105: the control device sends a second configuration parameter to the second AP, where the second configuration parameter is used to configure the second STA set and the starting time. The second configuration parameter is used to indicate that the second AP can send the second WLAN frame to at least one STA in the second STA set at the starting time by using the first channel resource.

A type of information carried in the second configuration parameter to configure the second STA set and the starting time is not limited in the application. For example, the second STA set may be configured by carrying an identifier of an STA included in the second STA set. For example, the starting time is configured by carrying the starting time.

In an embodiment, the control device may not configure a specific WLAN frame type (for example, a data frame or a trigger frame) of the second WLAN frame, but the second AP determines the second WLAN frame, for example, determines the second WLAN frame based on an actual transmission requirement. In another embodiment, the control device may alternatively configure the specific WLAN frame type of second WLAN frame.

S106: the second AP receives the second configuration parameter sent by the control device.

S107: the second AP sends, based on the second configuration parameter, the second WLAN frame to the at least one STA in the second STA set at the starting time by using the first channel resource. For example, the second AP is configured to start to send the second WLAN frame to the at least one STA in the second STA set at the starting time by using the first channel resource.

For the second AP, the second configuration parameter may be used as a reference, and the second AP does not necessarily need to send the second WLAN frame to the at least one STA in the second STA set at the starting time by using the first channel resource. For example, if the second AP does not have any to-be-sent WLAN frame at the starting time, no sending action is performed. For another example, if the first channel resource is unavailable (for example, the channel is busy) at the starting time, no sending action is performed.

How the second AP determines an STA or STAs in the second STA set to which the second AP sends the second WLAN frame is not limited in the application. In an embodiment, the second WLAN frame may be sent based on an actual transmission requirement. For example, when determining to schedule one or more STAs in the second STA set, the second AP may send the second WLAN frame to the one or more STAs. In addition, because different STAs associated with a same AP cannot use a same channel resource to transmit signals at the same time, the second AP may determine a quantity of to-be-scheduled STAs based on a quantity of types of channel resources that are of the second AP and that are used for parallel transmission. A quantity of types of channel resources used by the second AP for the parallel transmission may be the same as or partially the same as the quantity of types of channel resources used by the first AP for the parallel transmission.

The first channel resource may be configured by the control device for the second AP by using the second configuration parameter or another configuration parameter. In addition, the first channel resource may also be preset. For example, the second AP may work on a channel, and the channel is the same as a channel on which the first AP works. For another example, a time-frequency channel resource of an operating channel of the second AP is pre-divided into an RU 1 to an RU 10. The second AP may reserve the RU 1 to the RU 3 that are used to implement parallel signal transmission, and other RUs (e.g., the RU 4 to the RU 10) may be RUs used when a signal is transmitted based on the CSMA/CA mechanism. In this case, the RU 1 to the RU 3 may be used as the first channel resource. Further, assuming that the second STA set configured by the control device for the second AP includes an STA 21 to an STA 25, the second AP may select any one to three STAs from the STA 21 to the STA 25, and allocate one RU of the RU 1 to the RU 3 to each STA. Different RUs are allocated to different STAs. For example, the second AP may send the second WLAN frame to the STA 21 by using the RU 1, send the second WLAN frame to the STA 22 by using the RU 2, and send the second WLAN frame to the STA 23 by using the RU 3. The second AP may send a same second WLAN frame or different second WLAN frames to different STAs.

It can be learned that the first AP may send the first WLAN frame to the STA 11 by using the RU 1, and the second AP may send the second WLAN frame to the STA 21 by using the RU 1; and/or the first AP may send the first WLAN frame to the STA 12 by using the RU 2, and the second AP may send the second WLAN frame to the STA 22 by using the RU 2. In this way, a plurality of APs can send WLAN frames at the same time by using a same channel resource, to improve channel resource utilization.

Optionally, the second configuration information is used to configure a transmit power of the second WLAN frame. In this case, the S107 may include: the second AP sends, based on the second configuration parameter, the second WLAN frame to the at least one STA in the second STA set at the starting time by using the first channel resource and the transmit power of the second WLAN frame.

Optionally, the second configuration information is used to configure at least one piece of the following information: an MCS used to transmit the second WLAN frame, a Nsts used to transmit the second WLAN frame, DCM used to transmit the second WLAN frame, an encoding manner used to transmit the second WLAN frame, STBC used to transmit the WLAN frame, and the like.

For descriptions of related beneficial effects of the several optional implementations, refer to the foregoing descriptions. Details are not described herein again.

In addition, to ensure that a plurality of APs (for example, the first AP and the second AP) may send a WLAN frame at the starting time configured by the control device, a time synchronization protocol may be run between the plurality of APs, to ensure time synchronization between the plurality of APs. For example, a precision time protocol (PTP) protocol may be used to implement time synchronization. A specific of running the time synchronization protocol between the plurality of APs is not described in detail in the application.

In an embodiment, the control device may separately configure a corresponding configuration parameter for the first AP and the second AP, so that the first AP and the second AP can send, at a same starting time by using a same channel resource, a WLAN frame to at least one STA in an STA set separately configured for the first AP and the second AP. In this way, a plurality of APs can transmit WLAN frames in parallel by using a same channel resource, to improve channel resource utilization. Access points that send signals do not detect that a channel is busy, and the access points send the signals at a same starting time. Therefore, a signal of one access point does not cause a CCA result of another access point to be busy because the plurality of access points send signals at the same time. In addition, because the signal interference between any station in the first station set and any station in the second station set is less than the predefined threshold, the WLAN frame that is transmitted in parallel can be correctly decoded by properly setting the predefined threshold.

Optionally, the first configuration parameter is used to configure duration of the first WLAN frame. In this way, the control device configures the duration of the first WLAN frame, which helps avoid a problem caused by different duration of WLAN frames (for example, the first WLAN frame and the second WLAN frame) that are transmitted at the same time. The problem is as follows: An AP that has completely sent a WLAN frame determines that a channel is busy because the AP detects that a WLAN frame has not been completely sent by another AP, so that the AP that has completely sent the WLAN frame cannot occupy the channel, and further, the plurality of APs cannot continue to perform parallel signal transmission. Certainly, the duration of the first WLAN frame may alternatively be preset.

Correspondingly, optionally, the second configuration information is used to configure duration of the second WLAN frame.

Optionally, if the first WLAN frame is a data frame, the first configuration parameter is used to configure duration of an acknowledgment frame of the data frame. Alternatively, if the second WLAN frame is a trigger frame, and the trigger frame is used to trigger an STA that receives the trigger frame to send a data frame, the first configuration parameter is used to configure duration of an acknowledgment frame of the data frame. This helps avoid a problem caused by different duration of acknowledgment frames transmitted at the same time. The problem is as follows: An AP that has completely sent an acknowledgment frame determines that a channel is busy because the AP detects an acknowledgment frame that is not completely sent by another AP, so that the AP that has completely sent the acknowledgment frame cannot occupy the channel, and further, the plurality of APs cannot continue to perform parallel signal transmission. Certainly, regardless of whether the first WLAN frame is the data frame or a trigger frame, the duration of the acknowledgment frame of the data frame may be preset.

Correspondingly, optionally, if the second WLAN frame is a data frame or the trigger frame, and the trigger frame is used to trigger the STA that receives the trigger frame to send the data frame, the second configuration information is used to configure duration of the acknowledgment frame of the data frame.

For ease of description, a concept of a transmission timeslot is introduced in the application. The transmission timeslot refers to a starting time at which an AP sends a WLAN frame and an end time at which the AP sends or receives an acknowledgment frame. For example, if the WLAN frame is a data frame, one transmission timeslot refers to a time period from a starting time at which the AP sends the data frame to an end time at which the AP receives an acknowledgment frame of the data frame. For another example, if the WLAN frame is a trigger frame, one transmission timeslot is a time period from a starting time at which the AP sends the trigger frame to an end time at which the AP sends an acknowledgment frame, and the acknowledgment frame is an acknowledgment frame for acknowledging a data frame triggered by the trigger frame.

Optionally, the control device may be configured in one transmission timeslot or a plurality of consecutive transmission timeslots, and a plurality of APs may perform parallel transmission. In another transmission timeslot, each of the plurality of APs may send a signal based on the CSMA/CA mechanism or another existing mechanism. In this case, each AP may send a signal to any one or more STAs associated with the AP. In an embodiment, a plurality of APs (for example, the first AP and the second AP) can transmit signals in parallel in a time period, and the plurality of APs transmit signals based on the CSMA/CA mechanism or another existing mechanism in another time period.

If the control device is configured in the plurality of consecutive transmission timeslots, the plurality of APs may perform parallel transmission. Further, optionally, the control device may configure the plurality of APs to send trigger frames in each transmission timeslot of the plurality of transmission timeslots, or may configure the plurality of APs to send downlink WLAN frames in each transmission timeslot of the plurality of transmission timeslots, or may configure the plurality of APs to send trigger frames in some transmission timeslots of the plurality of transmission timeslots, and send downlink WLAN frames in other transmission timeslots. In an embodiment, indication may be performed by carrying indication information in configuration information, for example, may be performed in a bitmap manner.

Figure 5:
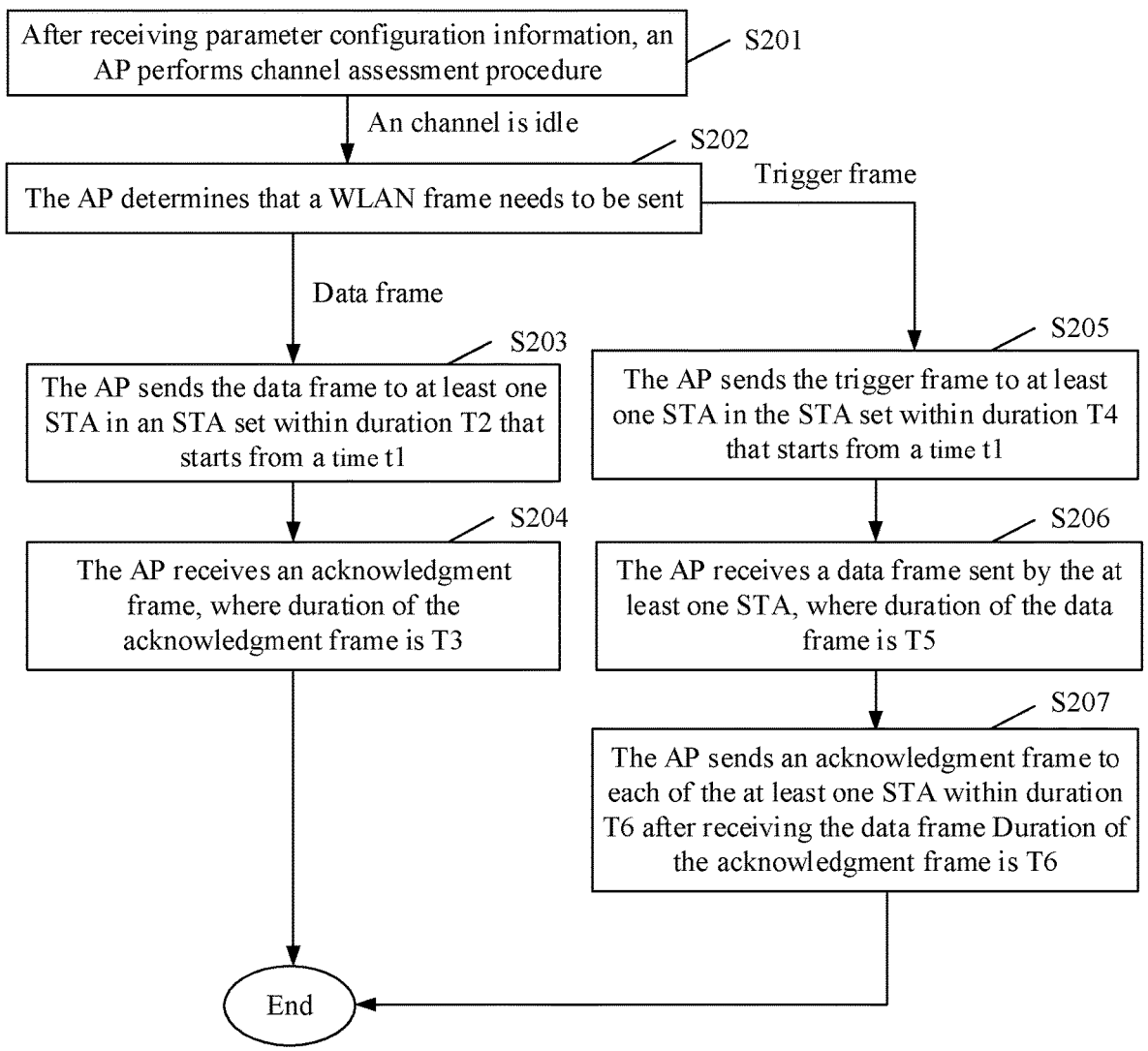
FIG. 5 is a schematic flowchart of transmitting a signal by an AP based on a configuration parameter according to an embodiment of the application.

FIG. 5 is a schematic flowchart of transmitting a signal by an AP based on a configuration parameter according to an embodiment of the application. In an embodiment, a WLAN frame is a data frame or a trigger frame. In addition, if the WLAN frame is the data frame, the configuration parameter is used to configure an STA set, a starting time $t1$ at which the data frame is sent, duration $T2$ of the data frame, and duration $T3$ of an acknowledgment frame of the data frame. If the WLAN frame is the trigger frame, the configuration parameter is used to configure an STA set, a starting time $t1$ at which the trigger frame is sent, duration of the trigger frame (or referred to as trigger frame duration of the trigger frame) $T4$, duration $T5$ of a data frame triggered by the trigger frame, and duration $T6$ of an acknowledgment frame of the data frame. When the WLAN frame is a management frame or another control frame other than the trigger frame, an embodiment in which the AP transmits the signal based on the configuration parameter may be obtained through inference based on the method shown in FIG. 4. Details are not described again in the application.

The method shown in FIG. 5 may include the following operations.

S201: After receiving the configuration parameter, the AP performs a channel assessment (for example, a CCA) procedure, for example, performs the CCA on each operating channel (for example, every 20 MHz bandwidth).

If the AP determines, by performing the channel assessment procedure, that the channel is busy, the S201 is performed after a time period or ends. If the AP determines, by performing the channel assessment procedure, that the channel is idle, S202 is performed.

Because an unlicensed frequency band is used in a WLAN technology, before using the channel (including sending or receiving data by using the channel), the AP needs to perform the channel assessment such as the CCA, to avoid interference to a signal that is being transmitted. Therefore, in the application, optionally, if the AP determines, at a starting time configured by using the configuration parameter, that the channel is idle by performing the CCA, the AP may send the WLAN frame. If determining that the channel is busy, the AP cannot send the WLAN frame.

S202: the AP determines to send the WLAN frame.

Figure 6:
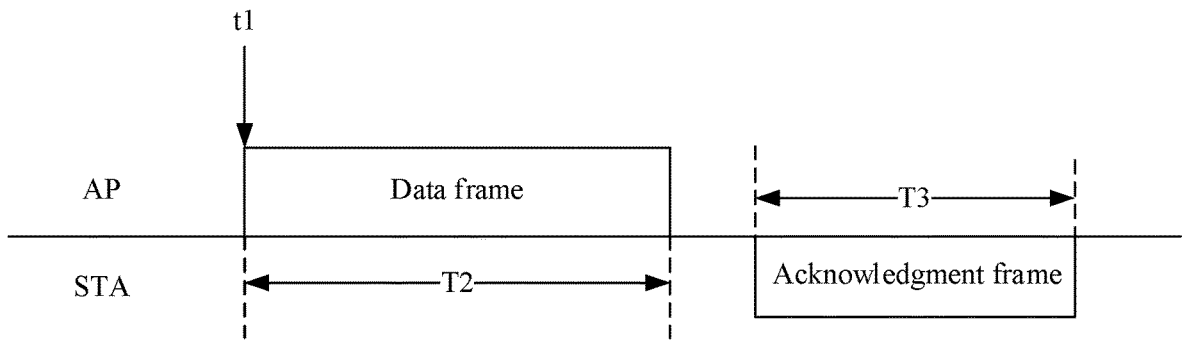
FIG. 6 is a schematic diagram 1 of a process of a parallel transmission method according to an embodiment of the application.

If the WLAN frame is the data frame, S203 is performed, as shown in FIG. 6.

Figure 7:
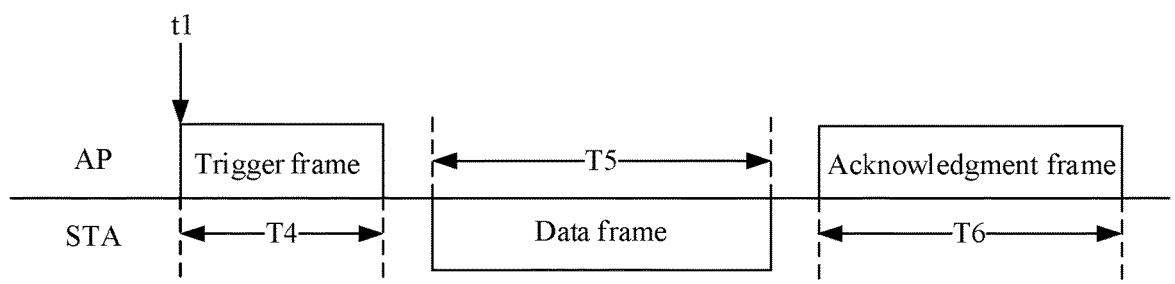
FIG. 7 is a schematic diagram 2 of a process of a parallel transmission method according to an embodiment of the application.

If the WLAN frame is the trigger frame, S205 is performed, as shown in FIG. 7.

In an embodiment, the AP may be the first AP. In this case, the WLAN frame may be the first WLAN frame, and the STA set may be the first STA set. In an embodiment, the AP may be the second AP. In this case, the WLAN frame may be the second WLAN frame, and the STA set may be the second STA set.

S203: the AP sends the data frame to at least one STA in the STA set within the duration T2 that starts from the time t1. Subsequently, the at least one STA may send the acknowledgment frame to the AP.

S204: the AP receives the acknowledgment frame, where the duration of the acknowledgment frame is T3. After the S204 is performed, the process ends.

S205: the AP sends the trigger frame to the at least one STA in the STA set within the duration T4 that starts from the time t1. Subsequently, the at least one STA may send the data frame to the AP based on the received trigger frame.

S206: the AP receives the data frame sent by the at least one STA, where the duration of the data frame is T5.

S207: the AP sends the acknowledgment frame to each of the at least one STA within the duration T6 after receiving the data frame. The duration of the acknowledgment frame is T6. After the S207 is performed, the process ends.

The foregoing mainly describes the solutions provided in the embodiments of the application from a perspective of the method. To implement the foregoing functions, the data processing method includes corresponding hardware structures and/or software modules for performing the functions. One of ordinary skill in the art should easily be aware that, in combination with units and algorithm operations of the examples described, embodiments disclosed in the application may be implemented by hardware or a combination of hardware and computer software. Whether a function is performed by hardware or hardware driven by computer software depends on particular applications and design constraints of the technical solutions. One of ordinary skill in the art may use different methods to implement the described functions for each particular application, but it should not be considered that the implementation goes beyond the scope of the application.

In an embodiment, a parallel transmission apparatus (for example, a control device or an access point) may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. In an embodiment, module division is an example, and is merely a logical function division. In an embodiment, another division manner may be used.

Figure 8:
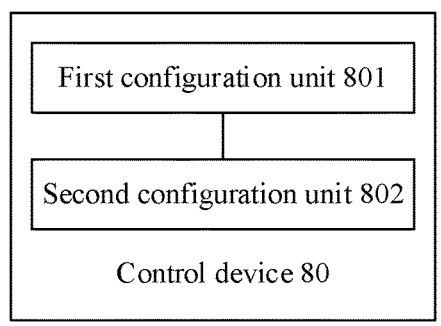
FIG. 8 is a schematic diagram 1 of a structure of a control device according to an embodiment of the application.

FIG. 8 is a schematic diagram of a structure of a control device according to an embodiment of the application. The control device 80 shown in FIG. 8 may be configured to perform operations performed by the control device in any method provided above. The control device 80 may include a first configuration unit 801 and a second configuration unit 802. The first configuration unit 801 may be configured to set a first configuration parameter for a first access point, and the first configuration parameter is used to configure a first station set and a starting time. The first station set includes one or more stations associated with the first access point. The first configuration parameter is used to indicate that the first access point can send a first WLAN frame to at least one station in the first station set at the starting time by using a channel resource. The second configuration unit 802 may be configured to set a second configuration parameter for a second access point, and the second configuration parameter is used to configure a second station set and the starting time. The second station set includes one or more stations associated with the second access point. The second configuration parameter is used to indicate that the second access point can send a second WLAN frame to at least one station in the second station set at the starting time by using the channel resource. Signal interference between any station in the first station set and any station in the second station set is less than a predefined threshold.

For example, if the control device 80 is integrated with the first access point, the first configuration unit 801 may be a processing unit, and the second configuration unit 802 may be a sending unit. If the control unit 80 is integrated with the second access point, the first configuration unit 801 may be a sending unit, and the second configuration unit 802 may be a processing unit. If the control device 80 is a device independent of the first access point and the second access point, the first configuration unit 801 and the second configuration unit 802 may be sending units. For example, with reference to FIG. 3, the first configuration unit 801 may be configured to perform the S102, and the second configuration unit 802 may be configured to perform the S105.

For explanations of related content and descriptions of beneficial effects refer to the foregoing method embodiments.

Figure 9:
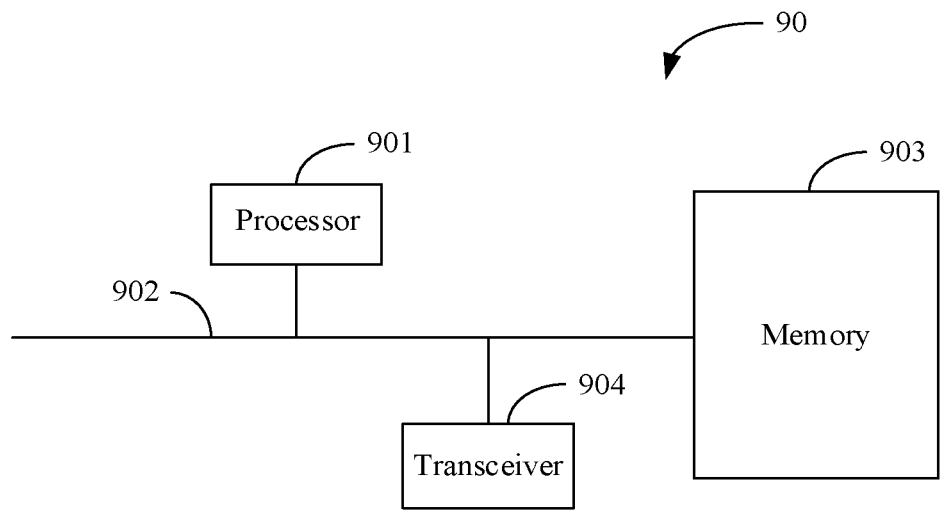
FIG. 9 is a schematic diagram 2 of a structure of a control device according to an embodiment of the application.

In an embodiment, the control device 80 is the device independent of the first access point and the second access point. FIG. 9 is a schematic diagram of a structure of a control device 90 according to an embodiment of the application. The control device 90 shown in FIG. 9 may include at least one processor 901, a communications line 902, a memory 903, and a transceiver 904.

The processor 901 may be a central processing unit (CPU), an application-specific integrated circuit (ASIC), or one or more integrated circuits configured to control program execution of solutions of the application.

The memory 903 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), an optical disc, a magnetic storage device, or any other medium that can be used to carry or store expected program code in a form of an instruction or a data structure and that can be accessed by a computer, but is not limited thereto. The memory may exist independently, and is connected to the processor through the communications line 902. The memory may alternatively be integrated with the processor. The memory 903 is configured to store a computer-executable instruction for executing the solutions in the application, and the processor 901 controls the execution of the computer-executable instruction.

The communications line 902 may include a path for transmitting information between the foregoing components.

The transceiver 904 is configured to communicate with another device (for example, a first access point and a second access point) or a communications network through any apparatus such as a transceiver.

The processor 901 is configured to execute the computer-executable instruction stored in the memory 903, to perform the following operations: sending a first configuration parameter to the first access point through the transceiver 904, where the first configuration parameter is used to configure a first station set and a starting time, the first station set includes one or more stations associated with the first access point, and the first configuration parameter is used to indicate that the first access point can send a first WLAN frame to at least one station in the first station set at the starting time by using a channel resource; and sending a second configuration parameter to the second access point through the transceiver 904, where the second configuration parameter is used to configure a second station set and the starting time, the second station set includes one or more stations associated with the second access point, and the second configuration parameter is used to indicate that the second access point can send a second WLAN frame to at least one station in the second station set at the starting time by using the channel resource. Signal interference between any station in the first station set and any station in the second station set is less than a predefined threshold.

Optionally, the computer-executable instruction may also be referred to as application program code, and this is not limited in the application. Optionally, the processor 901 may include one or more CPUs. Optionally, the control device 90 may include a plurality of processors. Each processor may be a single-core processor, or may be a multi-core processor.

In an example, if the first configuration unit 801 and/or the second configuration unit 802 are/is a processing unit, the processing unit may correspond to the processor 901. If the first configuration unit 801 or the second configuration unit 802 is a sending unit, the sending unit may correspond to the transceiver 904.

Figure 10:
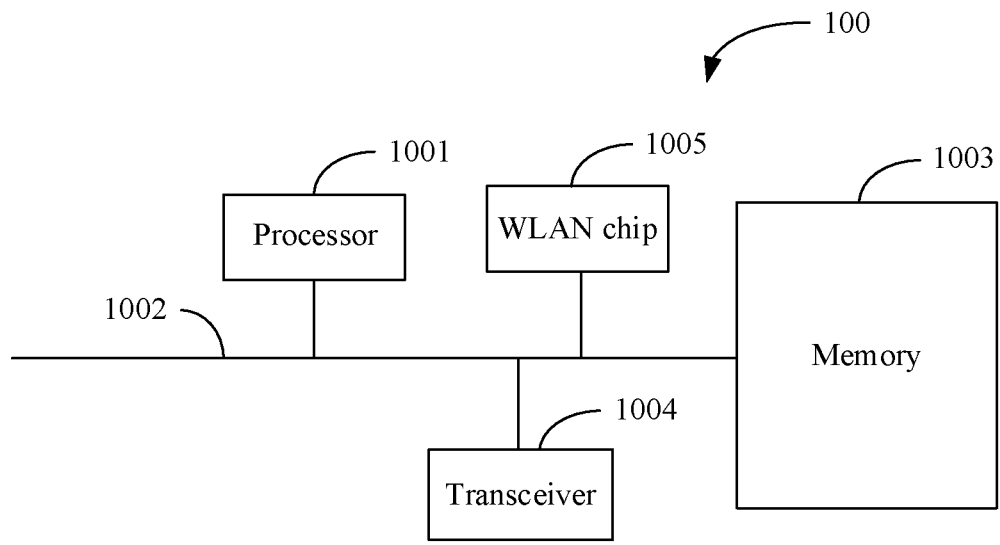
FIG. 10 is a schematic diagram 3 of a structure of a control device according to an embodiment of the application.

In an embodiment, if the control device 80 is a device integrated with an access point, as shown in FIG. 10, FIG. 10 is a schematic diagram of a structure of a control device 100 (or an access point 100) according to an embodiment of the application. The control device 100 shown in FIG. 10 may include at least one processor 1001, a communications line 1002, a memory 1003, a transceiver 1004, and a WLAN chip 1005. The processor 1001 and the WLAN chip 1005 may be integrated together, or may be disposed independently. The transceiver 1004 may include a wired transceiver or a wireless transceiver. The wireless transceiver may include the WLAN chip 1005.

The memory 1003 is configured to store program code.

The processor 1001 is configured to invoke the program code stored in the memory 1003, to perform the following operation: configuring a first configuration parameter for the WLAN chip 1005, where the first configuration parameter is used to configure a first station set and a starting time, the first station set includes one or more stations associated with the access point, and the first configuration parameter is used to indicate that the WLAN chip can send a first WLAN frame to at least one station in the first station set at the starting time by using the channel resource.

The WLAN chip 1005 is configured to: receive a plurality of WLAN frames from the processor 1001, select a WLAN frame whose receiver is a station in the first station set from the plurality of WLAN frames as the first WLAN frame, and send the first WLAN frame at the starting time by using the channel resource.

The processor 1001 is configured to set a second configuration parameter for another access point, where the second configuration parameter is used to configure a second station set and the starting time, the second station set includes one or more stations associated with the second access point, and the second configuration parameter is used to indicate that the another access point can send a second WLAN frame to at least one station in the second station set at the starting time by using the channel resource.

For explanations of related content and descriptions of beneficial effects, refer to the foregoing embodiments. In addition, for related descriptions of the processor 1001, the communications line 1002, the memory 1003, and the transceiver 1004, refer to the foregoing description.

In addition, based on the control device shown in any one of FIG. 8 to FIG. 10:

Optionally, the first configuration parameter is used to configure a first channel resource, or the second configuration parameter is used to configure the first channel resource. Alternatively, the first configuration parameter is used to configure the first channel resource, and the second configuration parameter is used to configure the first channel resource.

Optionally, the first configuration parameter is used to configure a transmit power of the first WLAN frame, or the second configuration parameter is used to configure a transmit power of the second WLAN frame. Alternatively, the first configuration parameter is used to configure the transmit power of the first WLAN frame, and the second configuration parameter is used to configure the transmit power of the second WLAN frame.

Optionally, the first WLAN frame is a first trigger frame, and the first configuration parameter is used to configure trigger frame duration of the first trigger frame. The second WLAN frame is a second trigger frame, and the second configuration parameter is used to configure trigger frame duration of the second trigger frame. The trigger frame duration of the first trigger frame is equal to the trigger frame duration of the second trigger frame.

Figure 11:
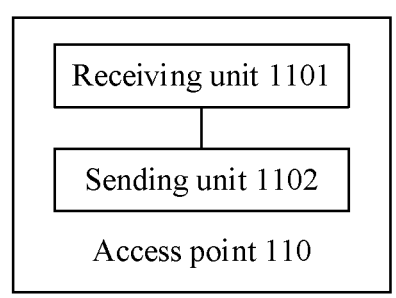
FIG. 11 is a schematic diagram 1 of a structure of an access point according to an embodiment of the application.

FIG. 11 is a schematic diagram of a structure of an access point according to an embodiment of the application. The access point 110 shown in FIG. 11 may be configured to perform operations performed by any access point in any method provided above. The access point 110 shown in FIG. 11 may include a receiving unit 1101 and a sending unit 1102. The receiving unit 1101 may be configured to receive a configuration parameter sent by a WLAN control device, where the configuration parameter is used to configure a station set and a starting time, the station set includes one or more stations associated with the access point, and the configuration parameter is used to indicate that the access point can send a WLAN frame to at least one station in the station set at the starting time by using a channel resource. The sending unit 1102 is configured to send, based on the configuration parameter, the WLAN frame to the at least one station in the station set at the starting time by using the channel resource. For example, with reference to FIG. 3, if the access point 110 is the first AP, the receiving unit 1101 may be configured to perform the S103, and the sending unit 1102 may be configured to perform the S104. If the access point 110 is the second AP, the receiving unit 1101 may be configured to perform the S106, and the sending unit 1102 may be configured to perform the S107.

Figure 12:
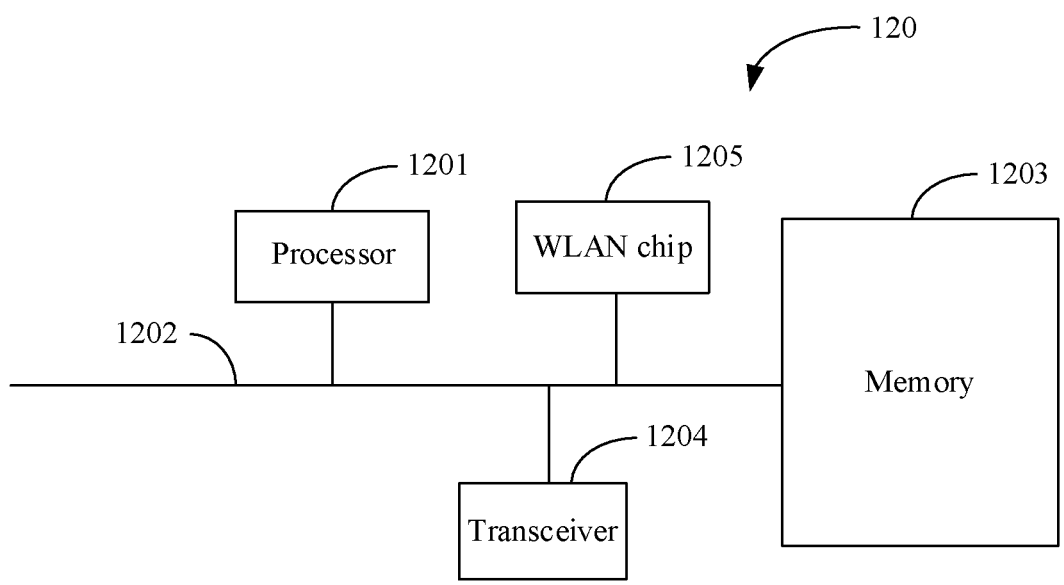
FIG. 12 is a schematic diagram of a structure of an access point according to an embodiment of the application.

In an embodiment, FIG. 12 is a schematic diagram of a structure of an access point 120 according to an embodiment of the application. The access point 120 shown in FIG. 12 may include at least one processor 1201, a communications line 1202, a memory 1203, a transceiver 1204, and a WLAN chip 1205. The processor 1201 and the WLAN chip 1205 may be integrated together, or may be disposed independently. The transceiver 1204 may include a wired transceiver or a wireless transceiver. The wireless transceiver may include the WLAN chip 1205.

The memory 1203 is configured to store program code.

The processor 1201 is configured to invoke the program code stored in the memory 1203, to perform the following operation: receiving, through the transceiver 1204, a configuration parameter sent by a WLAN control device, where the configuration parameter is used to configure a station set and a starting time, the station set includes one or more stations associated with the access point, and the configuration parameter is used to indicate that the access point can send a target WLAN frame to at least one station in the station set at the starting time by using the channel resource.

The WLAN chip 1205 is configured to: receive a plurality of WLAN frames from the processor 1201, select a WLAN frame whose receiver is a station in the station set from the plurality of WLAN frames as the target WLAN frame, and send the target WLAN frame at the starting time by using the channel resource.

For explanations of related content and descriptions of beneficial effects, refer to the foregoing embodiments. In addition, for related descriptions of the processor 1201, the communications line 1202, the memory 1203, and the transceiver 1204, refer to the foregoing description.

In addition, based on the access point shown in any one of FIG. 11 to FIG. 12:

Optionally, the configuration parameter is used to configure the channel resource.

Optionally, the configuration parameter is used to configure a transmit power of the WLAN frame. The sending unit 1102 or the WLAN chip 1205 is configured to send the WLAN frame to the at least one station in the station set at the starting time by using the channel resource and the transmit power of the WLAN frame.

Optionally, the WLAN frame is a trigger frame, and the configuration parameter is used to configure trigger frame duration. The sending unit 1102 or the WLAN chip 1205 is configured to send, at the starting time by using the channel resource, the trigger frame whose duration is the trigger frame duration to the at least one station in the station set.

All or some of the foregoing embodiments may be implemented through software, hardware, or a combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of the application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium may be any medium accessible by a computer, or a data storage device, such as a server or a data center, integrating one or more usable media. The medium may be a magnetic medium (for example, a floppy disk, a hard disk, or a magnetic tape), an optical medium (for example, an optical disc), a semiconductor medium (for example, a solid-state drive (solid state disk, SSD)), or the like.

Although the application is described with reference to the embodiments, one of ordinary skill in the art may understand and implement another variation of the disclosed embodiments by viewing the accompanying drawings, disclosed content, and the accompanying claims. A single processor or another unit may implement several functions enumerated in the claims. Some measures are recorded in dependent claims that are different from each other, but this does not mean that these measures cannot be combined to produce a better effect.

What is claimed is:

1. A parallel transmission method, comprising:
configuring, by a wireless local area network (WLAN) control device, a first configuration parameter for a first access point, wherein the first configuration parameter is used to configure a first station set and a starting time, the first station set comprises one or more stations associated with the first access point, and the first configuration parameter is used to indicate that the first access point can send a first WLAN frame to at least one station in the first station set at the starting time by using a channel resource; and
configuring, by the WLAN control device, a second configuration parameter for a second access point, wherein the second configuration parameter is used to configure a second station set and the starting time; the second station set comprises one or more stations associated with the second access point; the second configuration parameter is used to indicate that the second access point can send a second WLAN frame to at least one station in the second station set at the starting time by using the channel resource, wherein the WLAN control device separately configures a corresponding the first configuration parameter and the second configuration parameter for the first access point and the second access point to send the first WLAN frame and the second WLAN frame in parallel by using the same channel resource at the same starting time; and wherein a signal interference between any station in the first station set and any station in the second station set is less than a first predefined threshold, wherein whether each station belongs to the first station set is determined by a signal-to-interference ratio based on the signal interference, and wherein whether each station belongs to the second station set is determined by the signal-to-interference ratio based on the signal interference, wherein the signal-to-interference ratio between any station in the first station set and any station in the second station set is greater than or equal to a second predefined threshold, wherein a distance between any station in the first station set and the first access point is less than or equal to a third predefined threshold, wherein a distance between any station in the second station set and the second access point is less than or equal to a fourth predefined threshold.

2. The method according to claim 1, wherein
the first WLAN frame is a first trigger frame, the first configuration parameter is used to configure a trigger frame duration of the first trigger frame, the second WLAN frame is a second trigger frame, the second configuration parameter is used to configure the trigger frame duration of the second trigger frame, and the trigger frame duration of the first trigger frame is equal to the trigger frame duration of the second trigger frame.

3. The method of claim 1, wherein the first configuration parameter is used to configure a duration of the first WLAN frame.

4. The method of claim 1, further comprising:
determining, by the WLAN control device, at least one of the first station set and the second station set.

5. The method of claim 1, further comprising:
sending, by the WLAN control device, the first configuration parameter to the first access point.

6. The method of claim 1, further comprising:
sending, by the WLAN control device, the second configuration parameter to the second access point.

7. A parallel transmission method, comprising:
receiving, by an access point, a configuration parameter sent by a wireless local area network (WLAN) control device, wherein the configuration parameter is used to configure a first station set and a starting time, the first station set comprises one or more stations associated with the access point, and the configuration parameter is used to indicate that the access point can send a WLAN frame to at least one station in the first station set at the starting time by using a channel resource;
receiving, by a second access point, a second configuration parameter sent by the WLAN control device, wherein the second configuration parameter is used to configure a second station set and the starting time, the second station set comprises one or more stations associated with the second access point, and the second configuration parameter is used to indicate that the second access point can send a second WLAN frame to at least one station in the second station set at the starting time by using the channel resource, wherein a signal interference between any station in the first station set and any station in the second station set is less than a first predefined threshold, wherein whether each station belongs to the first station set is determined by a signal-to-interference ratio based on the signal interference, and wherein whether each station belongs to the second station set is determined by the signal-to-interference ratio based on the signal interference, wherein the signal-to-interference ratio between any station in the first station set and any station in the second station set is greater than or equal to a second predefined threshold, wherein a distance between any station in the first station set and the access point is less than or equal to a third predefined threshold, wherein a distance between any station in the second station set and the second access point is less than or equal to a fourth predefined threshold; and
sending, by the access point based on the configuration parameter, the WLAN frame to the at least one station in the first station set at the starting time by using the channel resource.

8. The method according to claim 7, wherein the WLAN frame is a trigger frame, and the configuration parameter is used to configure a duration of the trigger frame, and the sending comprises:
sending, by the access point at the starting time by using the channel resource, the trigger frame having the duration that is configured using the configuration parameter to the at least one station in the first station set.

9. The method of claim 7, further comprising:
selecting, by the access point, the at least one station.

10. The method of claim 7, wherein the WLAN frame is a data frame and a duration of the data frame is based on the configuration parameter.

11. The method of claim 7, further comprising:
receiving an acknowledgment frame, wherein a duration of the acknowledgment frame is based on the configuration parameter.

12. The method of claim 7, wherein the WLAN frame is a trigger frame, and the method further comprising:
receiving a data frame that is sent in response to the trigger frame.

13. An access point, comprising:
a processor and a wireless local area network (WLAN) chip coupled to the processor, wherein
the processor is configured to set a first configuration parameter, wherein the first configuration parameter is used to configure a first station set and a starting time, the first station set comprises one or more stations associated with the access point, and the first configuration parameter is used to indicate that the WLAN chip can send a first WLAN frame to at least one station in the first station set at the starting time by using a channel resource;
the WLAN chip is configured to: receive a plurality of WLAN frames from the processor, select, from the plurality of WLAN frames, a WLAN frame whose receiver is a station in the first station set as the first WLAN frame, and send the first WLAN frame at the starting time by using the channel resource; and
the processor is further configured to set a second configuration parameter for another access point, wherein the second configuration parameter is used to configure a second station set and the starting time, the second station set comprises one or more stations associated with the another access point, and the second configuration parameter is used to indicate that the another access point can send a second WLAN frame to at least one station in the second station set at the starting time by using the channel resource, wherein the processor separately configures a corresponding the first configuration parameter and the second configuration parameter for sending the first WLAN frame and the second WLAN frame in parallel by using the same channel resource at the same starting time, wherein a signal interference between any station in the first station set and any station in the second station set is less than a first predefined threshold, wherein whether each station belongs to the first station set is determined by a signal-to-interference ratio based on the signal interference, and wherein whether each station belongs to the second station set is determined by the signal-to-interference ratio based on the signal interference, wherein the signal-to-interference ratio between any station in the first station set and any station in the second station set is greater than or equal to a second predefined threshold, wherein a distance between any station in the first station set and the access point is less than or equal to a third predefined threshold, wherein a distance between any station in the second station set and the another access point is less than or equal to a fourth predefined threshold.

14. The access point of claim 13, wherein the first configuration parameter is used to configure a duration of the first WLAN frame.

15. The access point of claim 13, wherein the second configuration parameter is used to configure a duration of the second WLAN frame.

16. The access point of claim 13, wherein the WLAN frame is a data frame.

17. The access point of claim 13, wherein the WLAN frame is a trigger frame.

18. The access point of claim 13, wherein the WLAN chip is configured to send the first WLAN frame to the station in the first station set.

* * * * *